United States Patent
Hingant

(10) Patent No.: US 12,288,851 B2
(45) Date of Patent: Apr. 29, 2025

(54) METHOD FOR IDENTIFYING AN ELECTRICAL BATTERY

(71) Applicant: BLUE SOLUTIONS, Ergue Gaberic (FR)

(72) Inventor: Dominique Hingant, Saint Yvi (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 657 days.

(21) Appl. No.: 17/596,081

(22) PCT Filed: May 27, 2020

(86) PCT No.: PCT/EP2020/064617
§ 371 (c)(1),
(2) Date: Dec. 2, 2021

(87) PCT Pub. No.: WO2020/244975
PCT Pub. Date: Dec. 10, 2020

(65) Prior Publication Data
US 2022/0238925 A1    Jul. 28, 2022

(30) Foreign Application Priority Data

Jun. 6, 2019    (FR) ..................................... 1906025

(51) Int. Cl.
*H01M 10/42* (2006.01)
(52) U.S. Cl.
CPC .. *H01M 10/425* (2013.01); *H01M 2010/4278* (2013.01); *H01M 2220/20* (2013.01)
(58) Field of Classification Search
CPC ....... H01M 10/425; H01M 2010/4278; H01M 2220/20

USPC .......................................................... 429/90
See application file for complete search history.

(56) References Cited

U.S. PATENT DOCUMENTS

| | | |
|---|---|---|
| 5,729,115 A | 3/1998 | Wakefield |
| 6,236,186 B1 | 5/2001 | Helton et al. |
| 2016/0096444 A1* | 4/2016 | Chen .................. H02J 7/00043 701/22 |

OTHER PUBLICATIONS

"Multimeters 101: Basic Operation, Care and Maintenance and Advanced Troubleshooting for the Skilled Trades", Pfifer, https://books.google.com/books/about/Multimeters_101.html?id=b8_BxgEACAAJ, https://ecampusontario.pressbooks.pub/multimeters101/chapter/1-6-introduction-to-resistance-measurements/ (Year: 2018).*

(Continued)

*Primary Examiner* — Christian Roldan
*Assistant Examiner* — Robert Gene West
(74) *Attorney, Agent, or Firm* — Greer, Burns & Crain, Ltd

(57) ABSTRACT

A method for identifying an electrical battery provided with an electrical interface, called the identification electrical interface, including several pins, called the identification pins, at least one of the identification pins being connectable to at least one other identification pin to assign an identifier to the battery, the method includes at least one iteration of a step of reading the identifier, including the following operations carried out alternately for each of the identification pins: polarising the identification pin at a predetermined electric potential (V1), called the test potential; and detecting whether or not the test potential (V1) is present on each of the other identification pins in order to identify the identification pins which are looped together.

16 Claims, 3 Drawing Sheets

(56) References Cited

OTHER PUBLICATIONS

"Spice—Resistance between nodes (ohmmeter)", Strokebow, https://www.physicsforums.com/threads/spice-resistance-between-nodes-ohmmeter.539448/ (Year: 2012).*
French Search Report received for Application No. 1906025, dated Dec. 20, 2019.
International Search Report and Written Opinion received for PCT/EP/2020/064617 mailed Jul. 15, 2020.
IBM Corp, "Battery Type Indicator," IBM Technical Disclosure Bulletin, IBM Corp., vol. 35, No. 4A, 1992, pp. 449-450.

* cited by examiner

METHOD FOR IDENTIFYING AN ELECTRICAL BATTERY

BACKGROUND

The present invention relates to a method for identifying an electrical battery, in particular within a system comprising a, for example digital, communication bus connected to said battery. It also relates to a battery that can be identified by means of the method according to the invention, and a system, a vehicle, and an installation comprising such batteries.

The field of the invention is the field of identification of the electric batteries located in a network, in particular a digital network, in particular within an electric vehicle or an electrical installation.

An electric vehicle generally comprises a plurality of rechargeable batteries powering the electric motor of said vehicle. The number of batteries is determined depending on the desired power and range for the vehicle.

Within the vehicle, each battery can be connected to a communication bus, for example of the CAN type: in this case each battery of the vehicle must have a computerized identifier. It is also essential to be able to determine the location of each battery within the vehicle in order to be able to attend to said battery in case of need. However, the battery identifier does not necessarily indicate the location thereof in the vehicle, and vice-versa, which is problematic.

To overcome this drawback, the location of a battery within the vehicle is determined in the factory beforehand. Thus, each battery is allocated a location, on leaving the factory and before its installation in the vehicle. This solution makes management of the batteries more complex, both in the factory and with respect to the vehicle, and does not allow any flexibility during use of the batteries. For example, it is not possible to use a battery in a location other than the one allocated to it in the factory.

An aim of the present invention is to overcome at least one of these drawbacks.

Another aim of the invention is to propose a method for identifying an electric battery making it possible to simplify battery management, with respect to both production and use.

An aim of the invention is also to propose an identification method allowing simpler and more flexible use of an electric battery.

SUMMARY

The invention makes it possible to achieve at least one of these aims by means of a method for identifying an electrical battery equipped with an electrical interface, called identification interface, containing several pins, called identification pins, wherein at least one of said identification pins can be connected to at least another one of said identification pins in order to allocate an identifier to said battery, said method comprising a step of reading said identifier comprising the following operations, performed in turn for each of said identification pins:

polarizing said identification pin to a predetermined electric potential, called test potential; and
  detecting the presence, or not, of said test potential on each of the other identification pins;
for the purpose of identifying the identification pins that are looped back to one another within said identification interface.

Thus, the invention proposes, for an electric battery, to use an identification interface comprising several identification pins, and to allocate an identifier, in particular a digital identifier, to said battery, depending on whether said identification pins are connected to one another or not, at the input to the identification interface, this or these connection (s) then being detected by individually testing each identification pin with a test electric potential. As the identification pins are provided at an electrical interface, it is possible to modify the connection of said pins to one another as desired, at the input to said interface. In this way, it is possible to modify or to allocate, or even to impose, an identifier to, or on, the electric battery, as desired, depending on the requirements and/or a use configuration.

The method according to the invention therefore makes it possible to modify or allocate or even to impose an identifier, in particular a digital identifier, as desired, to or on any electric battery. Thus, the invention makes it possible to simplify the management of electric batteries, with respect to manufacture and use. In addition, the invention allows greater flexibility of use of the electric batteries.

In the present application, by "battery" or "electric battery" is meant:
  an assembly for storing electrical energy comprising electrical energy storage devices of the same type, such as for example capacitive-effect electrochemical batteries; and
  an electronic unit for managing said storage assembly.

Preferably, according to a particular but in no way limitative embodiment, the test potential can correspond to a voltage level corresponding to one of the two values of a digital bit, i.e. either to a first voltage level corresponding to a digital "1" or to a second voltage level corresponding to a digital "0". In this case, the electric potential used in the absence of the test potential can correspond to a voltage level corresponding to the other of the two values of a digital bit.

According to an embodiment example that is in no way limitative, the first voltage level, corresponding to a digital "1", can be of the order of, or equal to, 3.3 V. The second voltage level can be of the order of, or equal to, 0 V. Of course, it is possible to adopt voltage levels other than those indicated above. For example, it is possible to adopt the inverse of the levels indicated above: 3.3 V for a binary "0" and 0 V for a binary "1".

According to an alternative embodiment, it is possible to use a test potential that does not correspond to a voltage level associated with a value of a digital bit.

Preferably, the method according to the invention can moreover comprise a step of allocating an identifier to the electric battery by loopback of at least one of said identification pins to at least another one of said identification pins, prior to the reading step.

This allocation step can be performed before the first use of the battery.

This allocation step can then be repeated as many times as desired, for example to amend the identifier of the battery during use.

It should be noted that this allocation step is not necessarily performed for all the batteries. In particular, when a battery is allocated an identifier that does not correspond to any loopback between the identification pins, then this allocation step is not performed. In all the other configurations in which at least one identification pin is looped back to another identification pin, then the allocation step is performed at least once.

According to an embodiment example, the test potential can be an electric potential different from a ground potential of the electric battery.

The test potential can be, or be obtained from, a potential provided within the battery. To this end, the electric battery can comprise an electrical source, or an electronic unit, providing said potential.

Alternatively, the test potential can be, or be obtained from, a potential received at the identification interface, for example a potential provided via a communication bus.

According to an embodiment example, the test potential can be an electric ground potential used within the battery.

Such an electric ground potential can be the electric ground potential used for the electronic unit of the battery.

Such an electronic ground potential can be zero potential.

When a pin is polarized to the test potential, at least one, in particular each, of the other identification pins can be:
  polarized to a potential different from the test potential;
  not polarized to any electric potential, i.e. left "floating".

According to another aspect of the present invention, an electric battery is proposed, in particular a rechargeable battery, comprising:
  an electrical interface (102), called identification interface, containing several pins ($104_1$-$104_5$), called identification pins, wherein at least one of said identification pins can be connected to at least another one of said identification pins in order to allocate an identifier to said battery; and
  at least one electronic unit, called reading electronic unit, arranged to implement the reading step of the method according to the invention.

Advantageously, the battery according to the invention can moreover comprise at least one means of electrical loopback of at least one identification pin to at least one other identification pin.

It should be noted that such a loopback means does not necessarily exist in all the batteries. In particular, a battery the identifier of which corresponds to a configuration in which there is no loopback between the identification pins does not contain such a loopback means.

All the other batteries comprise at least one loopback means.

Advantageously, at least one loopback means can be capable of being dismantled, in particular without damaging the identification interface, or can be removable, in particular without using a tool.

The loopback means can be a galvanic connector, rigid or not, that connects at least two identification pins.

The loopback means can for example have the form of a connector capable of being plugged into the identification interface.

Preferably, the reading electronic unit can be a microprocessor, or an electronic chip, connected to the identification pins and programmed to perform the reading step.

More generally, the reading electronic unit can be any electronic component, or any electronic board comprising digital components and/or analogue components, configured to perform the reading step.

The battery according to the invention can comprise a lookup table indicating an item of identification data for each configuration of pin connection(s).

Such a lookup table can be fixed to the battery, or marked on a surface of the battery, or else provided on a support independent of the battery.

Such a lookup table can be stored in a memory forming part of the reading electronic unit, or capable of being read by the reading electronic unit. Thus, the latter can read this identifier as a function of the combination of loopback(s) it detected beforehand.

According to a particularly preferred embodiment example, the identification pins, and more generally the identification interface, can be positioned so as to be accessible to the user, in particular on an external face of the battery.

Thus, the battery according to the invention allows the user to modify the loopback of the identification pins, and thus the identifier of the battery, at any time.

The identification interface can have the form of an interface independent of any other interface.

The identification interface can in particular have the form of an independent connector.

In this case, it is possible that the identification interface does not perform any function other than the identification of the battery.

Alternatively, the identification interface can be integrated in an existing interface with which the battery is equipped, in particular an existing connector with which the battery is equipped.

Such an interface can for example be a communication interface of the battery.

In this case, specifically, several pins of said existing interface are used as identification pins.

According to another aspect of the present invention, a system is proposed comprising:
  a communication bus, in particular a digital communication bus; and
  at least one electric battery according to the invention, connected to said communication bus.

The batteries can perform one and the same function, or different functions.

The batteries can be identical or different, having the same storage technologies or different storage technologies.

Preferably, at least one battery is rechargeable.

According to another aspect of the present invention, a hybrid or electric vehicle is proposed comprising a system according to the invention.

The communication bus can be connected to a central management module or unit within the vehicle.

The vehicle according to the invention can be any type of vehicle carrying persons or objects, such as a car, a bus, a coach, a tyred tram, a boat, a lorry, a cable car, a lift, a hoist, a crane, etc.

According to yet another aspect of the same invention, an electrical installation is proposed comprising a system according to the invention.

The communication bus can be connected to a central management module or unit within the installation.

Such an electrical installation can be an electric charging station for electric or hybrid transport vehicles, or a station for electrically powering a building, a complex or an electrical/electronic communication device.

Such an electrical installation can be a station for regulation or smoothing, or even for buffer storage, of electrical energy, for example provided by an electricity grid or electricity generation means. Such a regulation or smoothing station makes it possible to store surplus electrical energy during a period of low consumption or high generation and to return the stored electrical energy during a period of high consumption or low generation respectively.

Advantageously, the installation according to the invention can comprise a means of generating electrical energy from a renewable source, such as at least one solar panel and/or at least one wind turbine and/or at least one marine turbine.

The energy produced by such a means can be used for recharging at least one battery.

Alternatively, or in addition, at least one battery can be recharged from the grid.

BRIEF DESCRIPTION OF THE DRAWINGS

Other advantages and characteristics will become apparent on examination of the detailed description of embodiments which are in no way limitative, and from the attached drawings, in which.

DETAILED DESCRIPTION

It is well understood that the embodiments that will be described hereinafter are in no way limitative. In particular, variants of the invention can be envisaged that comprise only a selection of the characteristics described below in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the figures, elements common to several figures retain the same reference.

Figure 1:
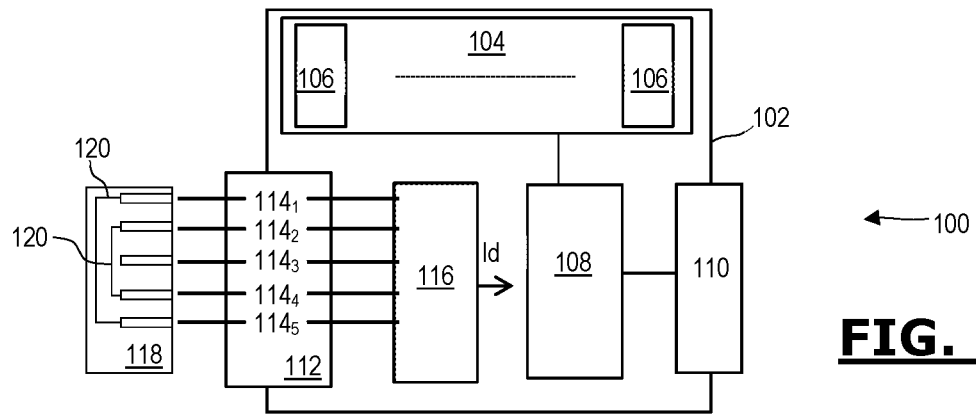
FIG. 1 is a diagrammatic representation of a non-limitative embodiment example of a battery according to the invention.

FIG. 1 is a diagrammatic representation of a non-limitative embodiment example of a battery according to the invention.

The battery 100 in FIG. 1 is rechargeable and can be used in any type of application, stationary or not.

The battery 100 comprises, in a casing 102, an assembly 104 of electrical energy storage elements 106, having the same technology, such as for example capacitive-effect electrochemical batteries.

The battery 100 moreover comprises an electronic unit 108 for managing the storage assembly 104 and a communication port 110 making it possible for the battery 100 to communicate with other apparatuses, for example via a communication bus (not shown).

The battery 100 also comprises an identification interface 112 comprising several identification pins $114_i$. In the example shown, the identification interface comprises five identification pins $114_1$-$114_5$.

Each of the identification pins $114_1$-$114_5$ is connected individually and independently to a microcontroller, or an electronic chip, 116. The microcontroller 116 is arranged/programmed to detect if at least two of the identification pins $114_1$-$114_5$ are looped back/connected to one another, at the input to the identification interface 112.

To this end, the microcontroller 116 polarizes the identification pin $114_1$ to a test potential V1 and measures the potential on each of the other identification pins $114_2$-$114_5$. If the test potential V1 is found on another of the identification pins $114_2$-$114_5$, then this indicates that this other identification pin is looped back to the identification pin $114_1$. The same operations are performed in turn, individually, for each of the other identification pins $114_2$ to $114_5$.

The microprocessor 116 is moreover configured to provide an item of identification data "Id" by consulting a lookup table indicating a unique item of identification data for each combination of loopback(s). This lookup table can be stored in a memory (not shown), internal or external to the microprocessor 116.

In addition, the battery 100 can be equipped with one or more loopback means 118 for connecting at least one of the identification pins $114_1$-$114_5$ to at least another one of the identification pins $114_1$-$114_5$, at the input to the identification interface 112.

In the example shown, the loopback means 118 has the form of a connector, male or female, being removably plugged into the identification interface 112. The connector 118 contains at least one internal electrical connection 120 connecting at least two of the identification pins $114_1$-$114_5$ to one another when it is plugged into the identification interface 112.

Of course, the loopback means 118 can have any other form: an electrical wire soldered to the identification pins, several individual connectors, etc.

In the example given, the test potential V1 is the electric ground potential. When an identification pin is set at the ground potential V1, then each of the other identification pins is polarized to a potential different from the ground potential.

Alternatively, the test potential V1 can be a potential different from the electric ground potential. In this case, the test potential V1 can be delivered by an electrical source (not shown) internal to the battery 100. Alternatively, this test potential can be a potential provided to the battery by an external source, for example via the communication bus connected to the communication interface 110.

In the example shown, the identification interface 112 is an individual interface, independent of any other interface. Alternatively, the identification interface 112 can be integrated in another interface of the battery, such as for example the communication interface 110, or in another connector of the battery 100.

In the example shown, the microcontroller 116 used for the identification is an independent and individual microcontroller. Alternatively, the microcontroller 116 can be integrated in another microcontroller, in another chip, or more generally, in another electronic unit. For example, the microcontroller 116 can be integrated in, or can be, a microcontroller or a chip forming part of the management electronic unit 108 of the storage assembly 104, or of an existing electronic unit in the battery 100.

Figure 2:
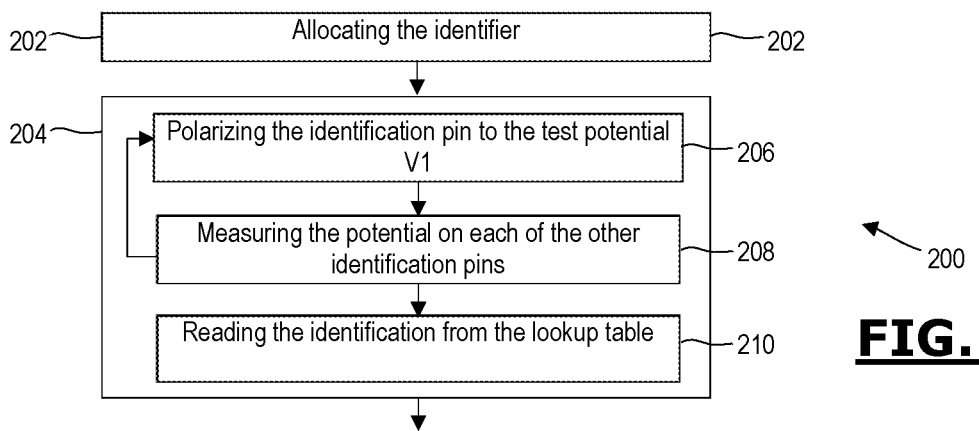
FIG. 2 is a diagrammatic representation of a non-limitative embodiment example of a method according to the invention.

FIG. 2 is a diagrammatic representation of a non-limitative embodiment example of an identification method according to the invention.

The method 200 in FIG. 2 can be implemented to identify a battery according to the invention, and in particular the battery 100 in FIG. 1.

The method 200 comprises a step 202 of allocation of an identifier to a battery. This step 202 comprises in particular a loopback of at least one identification pin of the identification interface to at least one other identification pin of said identification interface. This loopback can be permanent or removable, for example by virtue of a pluggable connector.

Then the method 200 comprises a reading step 204. The reading step 204 can be performed a single time and the determined identifier can be stored to then be used as many times as desired. Alternatively, the reading step 204 can be performed at each use of the identifier of the battery.

The reading step 204 comprises the following steps, performed in turn for each identification pin:
- a step 206 of polarizing the identification pin to the test electric potential V1; and
- a step 208 of detecting the presence, or not, of said test potential V1 on each of the other identification pins. This step 208 can be performed by measuring the electric potential on each of the other identification pins and comparing the measured potential with the test potential V1.

The purpose of the steps 206 and 208 is to detect all the electrical loopbacks existing between the identification pins. When the steps 206 and 208 have been performed for all the identification pins and all the electrical connections between the identification pins have been detected, then, during a step 210, a unique identifier corresponding to the combination of loopback(s) detected is read from a lookup table storing a unique identifier for each combination of loopback(s).

The identifier of the battery is then determined.

Figure 3:
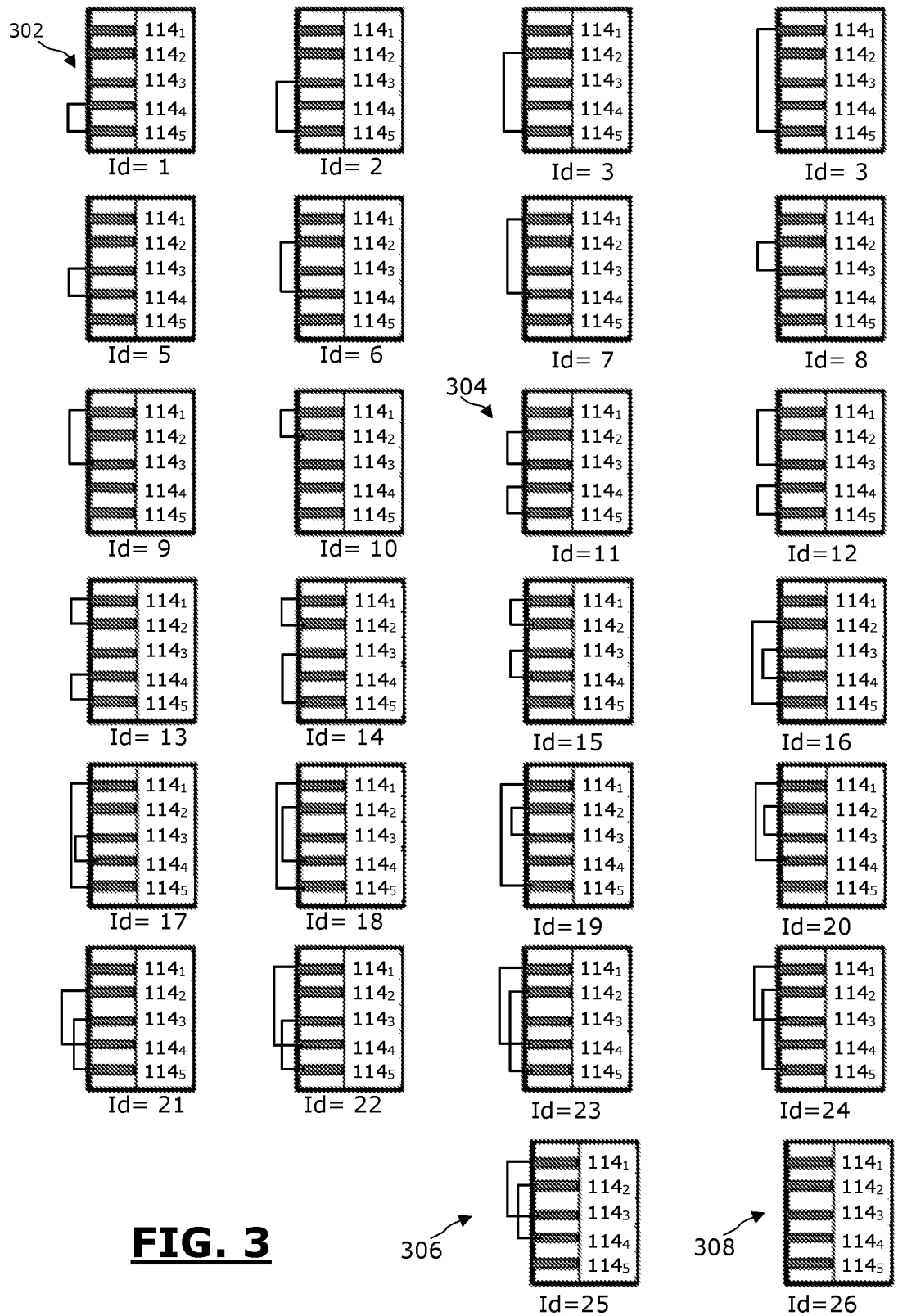
FIG. 3 is a diagrammatic representation of the different configurations that can be obtained with the battery in FIG. 1.

FIG. 3 gives diagrammatic representations of different combinations making it possible for different items of identification data to be obtained, with the battery 100 in FIG. 1.

For each combination shown in FIG. 3, the identifier "Id" is indicated below said combination.

For example, for the configuration 302, the identification pins $114_4$ and $114_5$ are connected to one another and are at the same electric potential. The identifier corresponding to this connection combination is "1".

For the configuration 304, the identification pins $114_4$ and $114_5$ are connected to one another, and the identification pins $114_2$ and $114_3$ are connected to one another. The identification pin $114_1$ is not connected to any identification pin. The identifier corresponding to this combination of connections is 11.

For the configuration 306, the identification pins $114_1$ and $114_3$ are connected to one another, and the identification pins $114_2$ and $114_4$ are connected to one another. The identification pin $114_5$ is not connected to any other pin. The identifier corresponding to this combination of connections is 25.

For the configuration 308, no identification pin is connected to another identification pin. The identifier corresponding to this combination is 26.

FIG. 3 represents in total 26 different combinations, each corresponding to a unique identifier.

Figure 4:
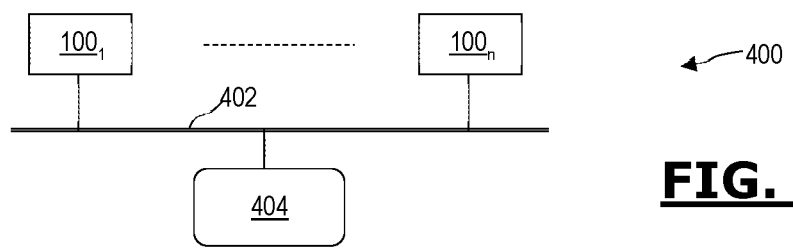
FIG. 4 is a diagrammatic representation of a non-limitative embodiment example of a system according to the invention.

FIG. 4 is a diagrammatic representation of a non-limitative embodiment example of a system according to the invention.

The system 400 in FIG. 4 comprises a plurality of batteries $100_1$-$100_n$ connected to a communication bus 402, for example a digital communication bus, such as for example a communication bus of the CAN type.

Each battery $100_i$ is a battery according to the invention, and in particular identical to the battery 100 in FIG. 1.

The system 400 can moreover optionally comprise a supervisor/controller apparatus 404, also connected to the communication bus 402. The system 400 can comprise apparatuses other than those shown, connected to the bus 402.

The batteries $100_1$-$100_n$ communicate with one another, or with the supervisor 404, via the communication bus 402, on which they must identify themselves with an identifier. To this end, each battery $100_i$ determines its own identifier, for example as described with reference to the battery 100 in FIG. 1, or according to the method 200 in FIG. 2.

The identification interface 112 of each battery $100_i$ has for example one of the configurations shown in FIG. 3, such that each configuration is used a single time in the system 400. Thus, it is possible to identify up to 26 apparatuses in the system 400, while ensuring that each apparatus will have a unique identifier in the system 400.

Of course, it is possible to identify more, or fewer, than 26 apparatuses, for example by respectively increasing or reducing the number of identification pins in the identification interface 112.

The identifier of each battery $100_i$ can be allocated by the user on the fly, for example depending on the location of said battery $100_i$ within the installation comprising the system 400. To this end, the user applies one of the configurations in FIG. 3 to the identification pins $114_1$-$114_5$ of the interface 112 of the battery $100_i$.

Figure 5:
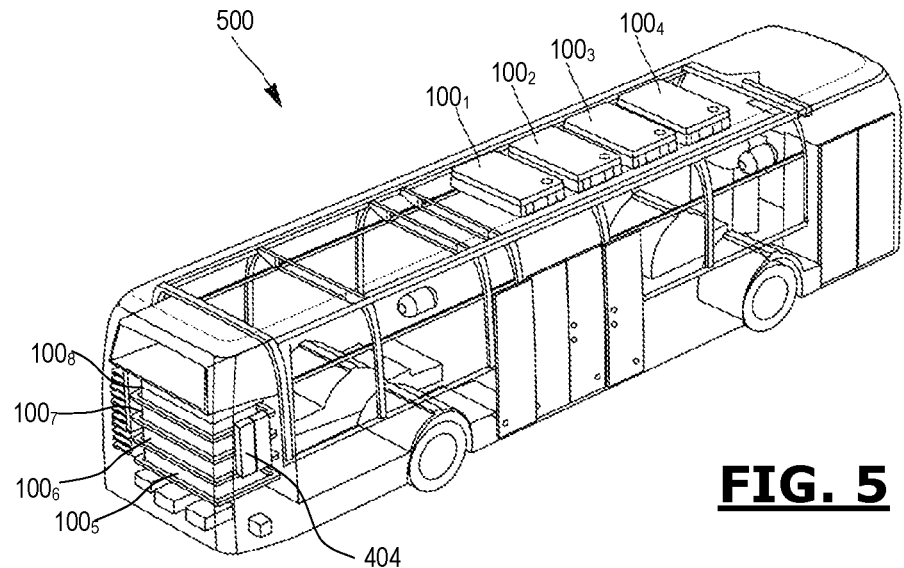
FIG. 5 is a diagrammatic representation of a non-limitative embodiment example of a vehicle according to the invention.

FIG. 5 is a diagrammatic representation of a non-limitative example of an electric vehicle according to the invention.

The electric vehicle 500, shown in FIG. 5, is an electric bus containing one or more electric motors (not shown).

The electric vehicle 500 is equipped with a system according to the invention, such as for example the system 400 in FIG. 4.

In particular, the vehicle 500 comprises eight rechargeable electric batteries $100_1$-$100_8$, of which four are placed in the upper wall of the vehicle 500 and four others are placed in a housing arranged in a rear wall of the bus 500.

The supervisor 404 can be for example a battery supervision unit, also called battery management system (BMS).

Thus, when a battery must be replaced in the vehicle 500, it is possible to use a battery while still having the opportunity to configure the identification interface 112 on the fly in order to allocate to it, or impose on it, the desired identifier, on the fly.

Figure 6:
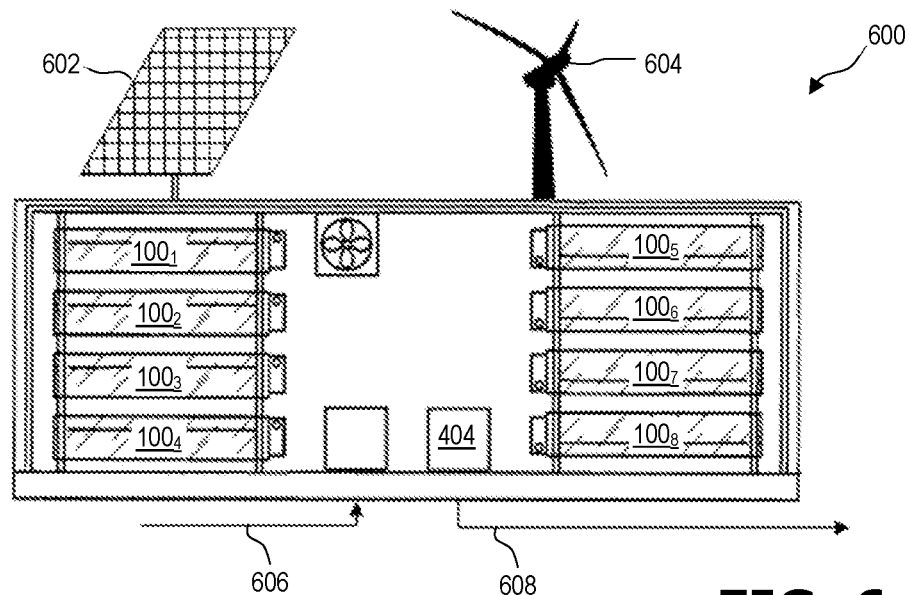
FIG. 6 is a diagrammatic representation of a non-limitative embodiment example of an electrical installation according to the invention.

FIG. 6 is a diagrammatic representation of a non-limitative example of an electricity supply installation according to the invention.

The electricity supply installation 600, shown in FIG. 6, can be an electric recharging station for electric vehicles such as electric buses or electric cars, an installation for electrically powering a building, a complex such as a football ground, a communication device such as a Wi-Fi (registered trade mark) hotspot or an antenna, etc.

The installation 600 is equipped with a system according to the invention, such as for example the system 400 in FIG. 4.

In particular, the installation 600 comprises eight rechargeable electric batteries $100_1$-$100_8$.

The supervisor 404 can be for example a unit for supervising the batteries $100_1$-$100_8$, also called battery management system (BMS).

It is possible to use one or more means for generating electrical energy from a renewable source to recharge the batteries $100_1$-$100_8$, such as for example solar panels 602 or one or more wind turbines 604.

Alternatively or in addition, each battery 100$_i$ can be recharged from an electrical energy distribution network, marked by the line referenced 606.

The installation 600 makes it possible to power a charging terminal, a complex, and more generally an electrical entity, via an electrical power line referenced 608.

Of course, the invention is not limited to the examples detailed above.

The invention claimed is:

1. A method for identifying an electrical battery equipped with an identification interface, containing several identification pins, wherein at least one of the identification pins is connectable to at least another one of the identification pins in order to allocate an identifier to the battery, the method comprising: a step of reading the identifier comprising the following operations, performed in turn for each of the identification pins:
   polarizing one of the identification pins to a test potential; and
   detecting the presence, or not, of the test potential on each of the identification pins which are non-polarized;
for the purpose of identifying the identification pins that are looped back to one another within the identification interface.

2. The method according to claim 1, further including a step of allocating an identifier to the electrical battery by loopback of at least one of the identification pins to at least another one of the identification pins, prior to the reading step.

3. The method according to claim 1, characterized in that the test potential is an electric potential different from a ground potential of the electrical battery.

4. The method according to claim 3, characterized in that the test potential is, or is obtained from, a potential:
   provided within the electrical battery; or
   received at the identification interface.

5. The method according to claim 1, characterized in that the test potential is an electric ground potential used within the electrical battery.

6. An electrical battery, in particular rechargeable, comprising:
   an electrical interface, called identification interface, containing several pins, called identification pins, wherein at least one of said identification pins can be connected to at least another one of said identification pins in order to allocate an identifier to said battery; and
   at least one electronic unit, called reading electronic unit, arranged to implement the reading step of the method according to claim 1.

7. The battery according to claim 6, characterized in that it comprises moreover at least one means of electrical loopback of at least one identification pin to at least one other identification pin.

8. The battery according to claim 7, characterized in that at least one loopback means can be dismantled or removed.

9. The battery according to claim 6, characterized in that the reading electronic unit is a microprocessor, connected to the identification pins, and programmed to perform the reading step.

10. The battery according to claim 6, characterized in that it comprises a lookup table indicating an item of identification data for each configuration of pin connection(s).

11. The battery according to claim 6, characterized in that at least one of the identification pins, and the identification interface, are positioned on an external face of the battery.

12. The battery according to claim 6, characterized in that the identification interface has the form of an interface independent of any other interface.

13. The battery according to claim 6, characterized in that the identification interface is integrated in an existing interface with which the battery is equipped.

14. A system, comprising:
   a communication bus; and
   at least one battery according to claim 6, connected to said communication bus.

15. A vehicle, electric or hybrid, comprising a system according to claim 14.

16. An electrical installation comprising a system according to claim 14.

* * * * *